A. E. MAYNARD.
SPECTACLE FRAME MACHINERY.
APPLICATION FILED JULY 26, 1920.
1,406,053.
Patented Feb. 7, 1922.
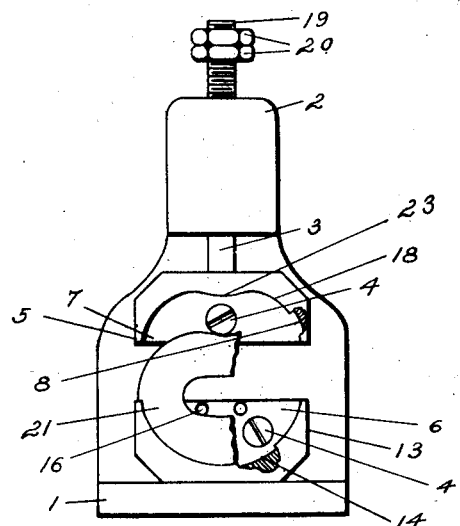
Fig. I
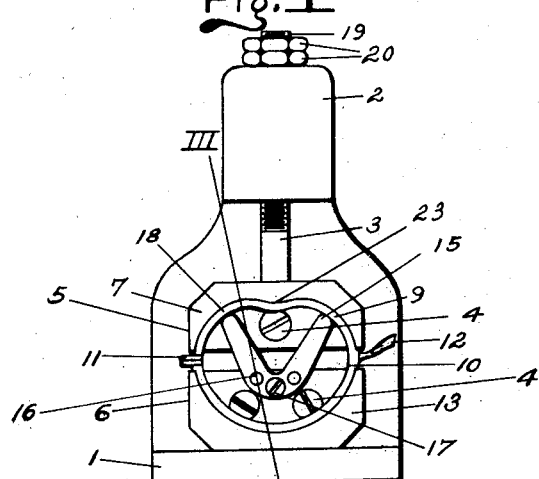
Fig. II
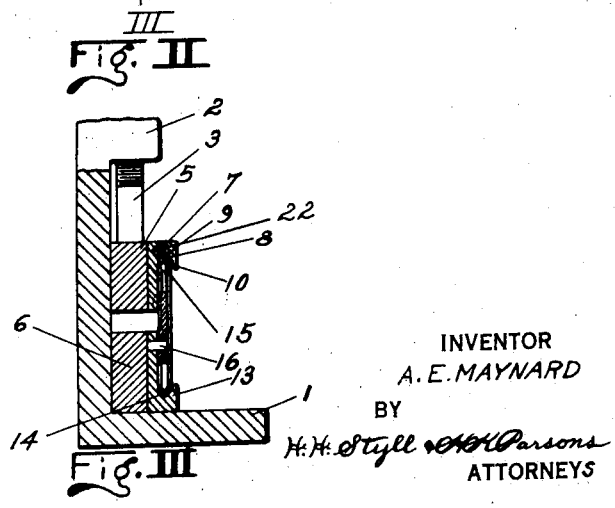
Fig. III
INVENTOR
A. E. MAYNARD
BY
H. H. Styll   A. H. Parsons
ATTORNEYS

UNITED STATES PATENT OFFICE.

ALBERT E. MAYNARD, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

SPECTACLE-FRAME MACHINERY.

1,406,053.   Specification of Letters Patent.   Patented Feb. 7, 1922.

Application filed July 26, 1920. Serial No. 399,065.

*To all whom it may concern:*

Be it known that I, ALBERT E. MAYNARD, a citizen of the United States, residing at Southbridge, in the county of Worcester and State of Massachusetts, have invented certain new and useful Improvements in Spectacle-Frame Machinery, of which the following is a specification.

This invention relates to improvements in machines for the manufacture of spectacle frames and has particular reference to novel and improved mechanism for imparting desired shape or form to the lens-receiving frame of a spectacle, eyeglass or the like.

One of the principal objects of the present invention is the provision of a novel and improved construction of machine or device for this purpose which will satisfactorily handle both metallic and non-metallic frames and also frames which are a combination of metallic and non-metallic parts, these being particularly difficult to shape satisfactorily.

A further object of the present invention is the provision of a structure of the type above set forth which may be satisfactorily employed in connection with an ordinary round eye frame to change the same to an oval drop eye frame or frame of other configuration in a satisfactory manner and without undue loosening or separating of the parts in the case of a combination frame, and without placing undue strain on such parts or breaking away or loosening of the parts at the end piece as has been liable to occur in connection with prior art structures.

Other objects and advantages of my improved construction should be readily apparent by reference to the following specification taken in connection with the accompanying drawings, and it will be understood that I may make any modification in the specific details of the construction shown and described within the scope of the appended claims without departing from or exceeding the spirit of my invention.

Figure I represents a front view of a machine constructed in accordance with and embodying the principles of my invention.

Figure II represents a similar view showing the position of the parts at the completion of the shaping operation, and Figure III represents a sectional view taken as on the line III—III of Figure II.

In the past in the construction of what is known as frames or eye wires for the lenses of ophthalmic mountings, it has been customary to form these of different shapes, the frame in these conditions being made of metal only or of non-metallic material only. In the case of an all-metal frame, the same has ordinarily been shaped by securing the endpieces in a suitable manner and then placing within the closed frame an expansible former of correct type and interiorly stretching the frame to fit the former. A similar method has been employed in the case of all-zylonite, shell, or non-metallic frames, the difference being that these are ordinarily heated during the stretching process and then allowed to cool and become set to the new shape. With the development, however, of a new type of mounting known as the Windsor, comprising an inner metallic lens-receiving rim and an outer surrounding non-metallic portion, a different problem has been encountered. This is due to the fact that the old system of stretching around a former cannot be satisfactorily employed with this frame since interior stretching places an undue strain on the outer non-metallic material, particularly at the point of attachment, tending to cause the same to break away or to become loosened at this point during the shaping operation. It is, therefore, the primary object and purpose of the present invention to provide a novel and improved mechanism capable of satisfactorily adjusting the shaping frames of this character but so constructed as also to receive and properly shape metallic or non-metallic frames as well.

In the accomplishment of this result, in the form of mechanism here illustrated I have shown a type of sub-press mechanism, comprising the base 1, an upper bearing 2 for the slide plunger 3, said base and bearing having removably secured thereto as by the fastening members 4 the upper clamp or sliding jaw 5 and the lower jaw 6. Each of the members 5 and 6 is provided on its front face with the supplemental plate portion 7 undercut as at 8 to form a recess adapted to receive the outer non-metallic portion 9 of the frame member 10. This frame 10 is shown in the drawings as at one side of the endpieces 11 and the bridge member 12, and when in position rests against the two jaw members as will best be understood by reference to Figure III. It will be noted that the lower jaw member 6 is also provided with a plate portion 13 undercut as at 14 to receive the frame, the shape of the undercut edges of the plates 7 and 13 together forming substantially the shape desired to be produced in the final frame with the exception that the spacing between the jaws 5 and 6 leaves room for the endpiece member 11 and bridge 12.

In use, the frame members 9 and 10 are placed in position against the faces of the jaws 5 and 6 and the plunger 3 depressed to bring the plates into tight engagement with the frames, the pressure being continued until the frame has assumed the shape outlined by the undercut recesses of the plates 7 and 13. In this way a uniform pressure is at one time applied to the entire circumference of the non-metallic member 9, holding the same so that there is no strain tending to break it loose at the point of attachment to the member 10 and no undue denting or marring thereof tending to cause subsequent breakage. To assist in this shaping action, however, I preferably secure to one of the jaw members the horse shoe shaped pusher plate 15 removably held as on the pins 16 by the fastening device 17 and adapted to engage the interior face of the frame 10 as the jaws are brought together to best force the frame up into the corners as at 18. This is particularly desirable in case of what is known as drop eye frames or frames in which a round frame is flattened at the top, in that the material will best be caused to fit back into the corners as the center of the top is flattened down through the use of a pusher such as the member 15 rather than depending entirely on the stiffness of the frame to push it up, thus removing any possibility of kinking of the frame or the like with the entire pressure applied to the outer surface.

In connection with the use of the pusher it will be understood that it is particularly desirable to have some type of gage or stop mechanism to limit the approach of the jaws to each other at the exact completion of the shaping operation. To accomplish this result I may if desired form a plunger with a threaded portion 19 and a pair of adjustable lock nuts 20 thereon to engage the portion 2 and limit the downward movement of the plunger. A gage such as shown at 21 in Figure I may be satisfactorily employed in this connection, this gage being shown as inserted between the jaws in the same manner that a frame to be shaped is inserted with the difference that it is formed from hardened steel to exact correct size and shaped, and after its insertion the plunger may be depressed and locked at the correct adjustment through regulation of the nuts 20. This operation having been performed, the gage is removed and ordinary round frames may be then successively positioned against the jaws and the plunger actuated to change them to the drop eye or other shape. Particular illustration and mention has been made of the drop eye shape as this is one of the most difficult to form, but it will be understood that my mechanism is equally applicable for use in connection with various styles, sizes, and shapes of frames which it may be desired to construct, it merely being necessary to remove the jaw members through loosening of the fastening devices 4 and to substitute new jaws and properly adjust the plunger in order to produce the desired shapes.

While in most instances, particularly when the zylonite is not unduly dried out, my machine may be satisfactorily employed to shape the combination zylonite and metal frame 9 shown in position therein, I have found that in some instances it is more desirable to make use of heat to soften a non-metallic frame and cause it to stay in the desired new position. The particular difficulty experienced is in connection with the central upper portion of the eye which in the finished frame is substantially flat. To get around this difficulty I, therefore, preferably embed in the upper shaper member 7 a heating coil 22 and also form it with the slight reversely curved portion 23 to put an initial downward set into the frame as shaped, this central downward set cooperating with the upward ends of the member 15 to force the material out into the bends, as at 18, and insure the best and most permanent final shape for the frame.

I claim—

1. A device of the character described including a pair of jaw members, means for shifting said jaws toward each other, said jaws each bearing undercut shaper plates, and a presser member carried by one of the jaws for forcing a frame into close engagement with the shaper plate of the other jaw.

2. In a spectacle-making machine, the combination with a pair of jaws each having an undercut recessed plate formed thereon providing a frame-receiving groove on the face of the jaw, of means for shifting the jaws toward each other to exteriorly engage and shape a lens frame.

3. In a spectacle-making machine, the combination with a pair of jaws each having an undercut recessed plate formed thereon providing a frame-receiving groove on the face of the jaw, of means for shifting the jaws toward each other to exteriorly engage and shape a lens frame, and means for regulating the approach of the shaping members.

4. In a spectacle-making machine, the combination with a pair of jaws each having an undercut recessed plate formed thereon providing a frame-receiving groove on the face of the jaw, of means for shifting the jaws toward each other to exteriorly engage and shape a lens frame, and an interior pusher member carried by one jaw for co-operation with the plate of the opposite jaw.

5. In a spectacle-making machine, the combination with a pair of jaws each having an undercut recessed plate formed thereon providing a frame-receiving groove on the face of the jaw, of means for shifting the jaws toward each other to exteriorly engage and shape a lens frame, and an interior pusher member carried by one jaw for co-operation with the plate of the opposite jaw, and means for regulating the approach of the jaws to each other.

6. A device for the purpose described, comprising a pair of jaw members, means for shifting said members toward each other and removable presser members carried thereby interiorly shaped to a particular configuration of ophthalmic frame, and means for limiting the movement of the jaw members according to the size of frame to be shaped.

7. A device for the purpose described, comprising a pair of jaw members, means for shifting said members toward each other and removable presser members carried thereby interiorly shaped to a particular configuration of ophthalmic frame, and means for limiting the movement of the jaw members according to the size of frame to be shaped, and a pusher member carried by one of the removable devices for co-operation with the other to aid in pressing the frame into the corner portions of the latter.

8. A frame shaping device including a pair of jaws shiftable toward each other, and shaper plates carried by the jaws and undercut in the direction of the jaws whereby pressure of the plates against a frame will through the undercutting draw the frame tightly against the face of the jaws and prevent twisting thereof.

9. A device for the purpose described, comprising a pair of jaw members, means for shifting said members toward each other, one of said members having a reverse inwardly curving frame engaging portion to engage the exterior of the frame and the opposite jaw having a bifurcated member for interiorly engaging the same portion of the frame in spanning relation to the inner projection of the opposed jaw.

10. A device of the character described including jaw members having undercut frame receiving portions and a heating device carried by one of the jaw members adjacent the frame receiving portion for applying heat to the frame during the shaping operation.

In testimony whereof I have affixed my signature, in presence of two witnesses.

ALBERT E. MAYNARD.

Witnesses:
ESTHER M. LAFLER,
ALICE G. HASKELL.